United States Patent [19]

Mori

[11] Patent Number: 4,527,859
[45] Date of Patent: Jul. 9, 1985

[54] SUNBEAM CONCENTRATING AND COLLECTING APPARATUS

[76] Inventor: Kei Mori, No. 3-16-3-501, Kaminoge, Setagaya-ku, Tokyo, Japan

[21] Appl. No.: 489,403

[22] Filed: Apr. 28, 1983

[30] Foreign Application Priority Data

May 6, 1982 [JP] Japan .................................. 57-75877

[51] Int. Cl.³ .............................................. G02B 7/00
[52] U.S. Cl. .................................. 350/252; 126/440; 159/15; 350/245
[58] Field of Search .................. 126/417, 440; 159/15; 350/245, 252

[56] References Cited

U.S. PATENT DOCUMENTS 3,493,291 2/1970 Webb .................................. 126/440
4,303,057 12/1981 Crandon et al. ..................... 350/245

FOREIGN PATENT DOCUMENTS 57-14149 1/1982 Japan .................................. 126/440
57-14150 1/1982 Japan .................................. 126/440

Primary Examiner—John K. Corbin
Assistant Examiner—William Propp
Attorney, Agent, or Firm—Cantor and Lessler

[57] ABSTRACT

A sunbeam concentrating and collecting apparatus characterized in that a honeycomb or regular n-sided polygonal frame is configured with one or a plurality of regular n-sided polygonal holding frames each of which is respectively formed by coupling a plurality of frame pieces each of which is then provided with at least one or a plurality of angled portions. A lens or lenses are disposed along one end plane of the frame, and the lens or lenses are supported by the adjustable supporting means which are held by said frame.

9 Claims, 8 Drawing Figures

SUNBEAM CONCENTRATING AND COLLECTING APPARATUS

BACKGROUND OF THE INVENTION

The present invention relates to a sunbeam concentrating and collecting apparatus. In more detail, the present invention relates to a sunbeam concentrating and collecting apparatus having a desired capacity and of a structure suitable for mass-production utilizing several kinds of standardized common material members.

The inventor of the present invention has invented a sunbeam collecting and transmitting apparatus for use in a variety of application fields having such a structure that sunbeams are concentrated through a Fresnel lens and the concentrated sumbeam is transmitted to the other desired place through a light conductor cable. The apparatus developed by the same inventor has been rather restricted only to a apparatus of a small capacity but recent increase in demand calls for further improvement thereof in view of easily realizing low cost apparatus in diversified capacities.

With the aforementiond background in mind, the present invention relates to a sunbeam concentrating and collecting apparatus for use with said sumbeam collecting and transmitting apparatus.

SUMMARY OF THE INVENTION

The present invention is thus intended to provide a new version of sunbeam concentrating and collecting apparatus in a novel structure just being suitable for mass-production of the same in various sizes utilizing common material members.

DETAILED DESCRIPTION OF THE DRAWINGS

A preferred embodiment of the present invention is explained hereunder with reference to the attached drawings.

Figure 1:
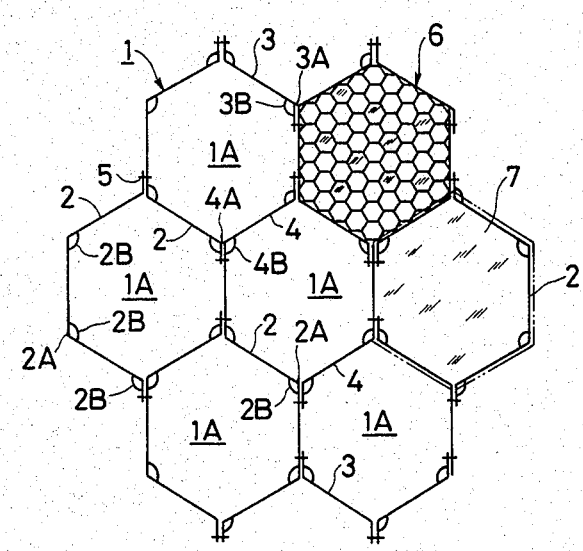
FIG. 1 is an elevational view of an embodiment of the frame of sunbeam concentrating and collecting apparatus to which the present invention is applied.
Figure 2A:
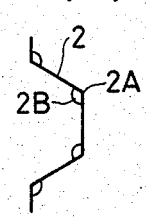
FIG. 2 is an outline structure view of respective frame pieces which form the holding frame illustrated in FIG. 1
Figures 2B, 2C:
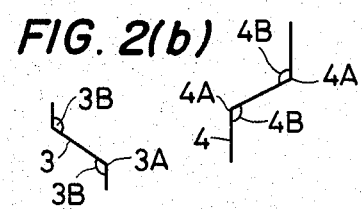

FIG. 1 is an elevational view of an embodiment of the holding frame of a sunbeam concentrating and collecting apparatus to which the present invention is applied. The frame 1 is configured in a honeycomb-shape be integrating a plurality of unit frames 1A having a regular hexagonal shape each of which is considered as the minimum unit. Said holding frame 1 is formed by respectively coupling three kinds of frame pieces 2 to 4 shown in (a) to (c) of FIG. 2 with bolts 5. When the holding frame 1 is once formed, an aggregate of hexagonal lenses 6 or a single hexagonal lens 7 is disposed in each unit frame 1A, and said aggregate of lenses 6 or single lens 7 is supported by the adjustable supporting means 8 (refer to FIG. 3 and successive figures) connected to the holding frame 1.

In this embodiment, the frame pieces 2 to 4 which form said holding frame 1 are respectively configured as plate pieces and each of said pieces 2 to 4 is provided with at least one or more angled portions 2A to 4A, each of which forms the crest portion of unit frame 1A and moreover the inside of said angled portion is provided with grooves as supporting portions 2B to 4B which are formed by partly protruding said frame piece.

Figure 3A:
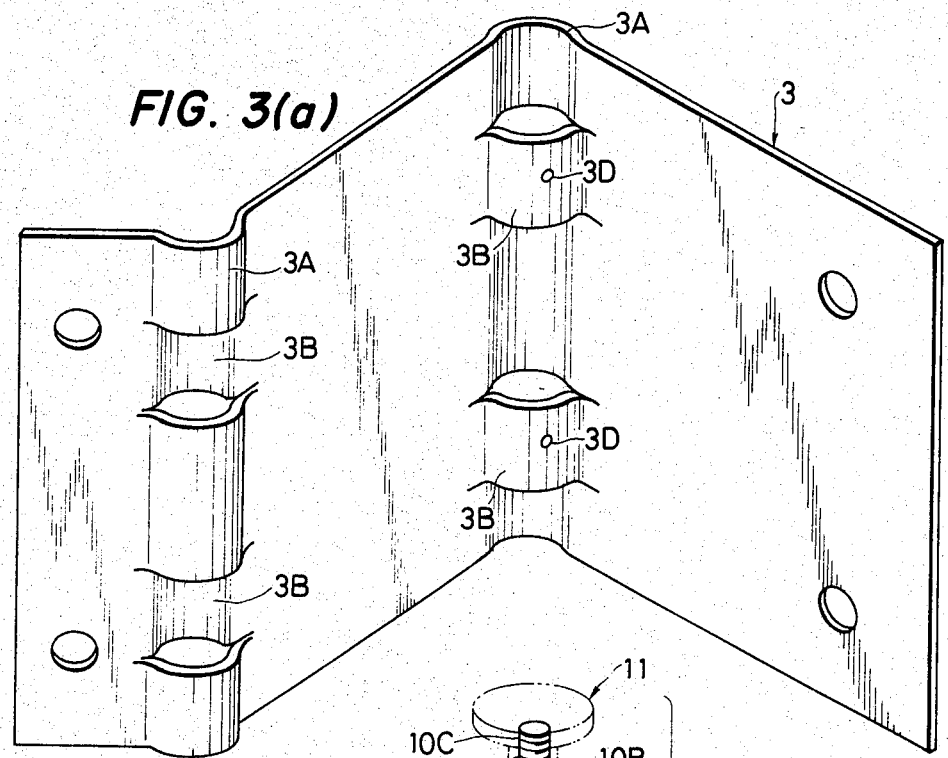
FIGS. 3(a), (b) are enlarged views of structures of frame pieces illustrated in FIG. 2.
Figure 3B:
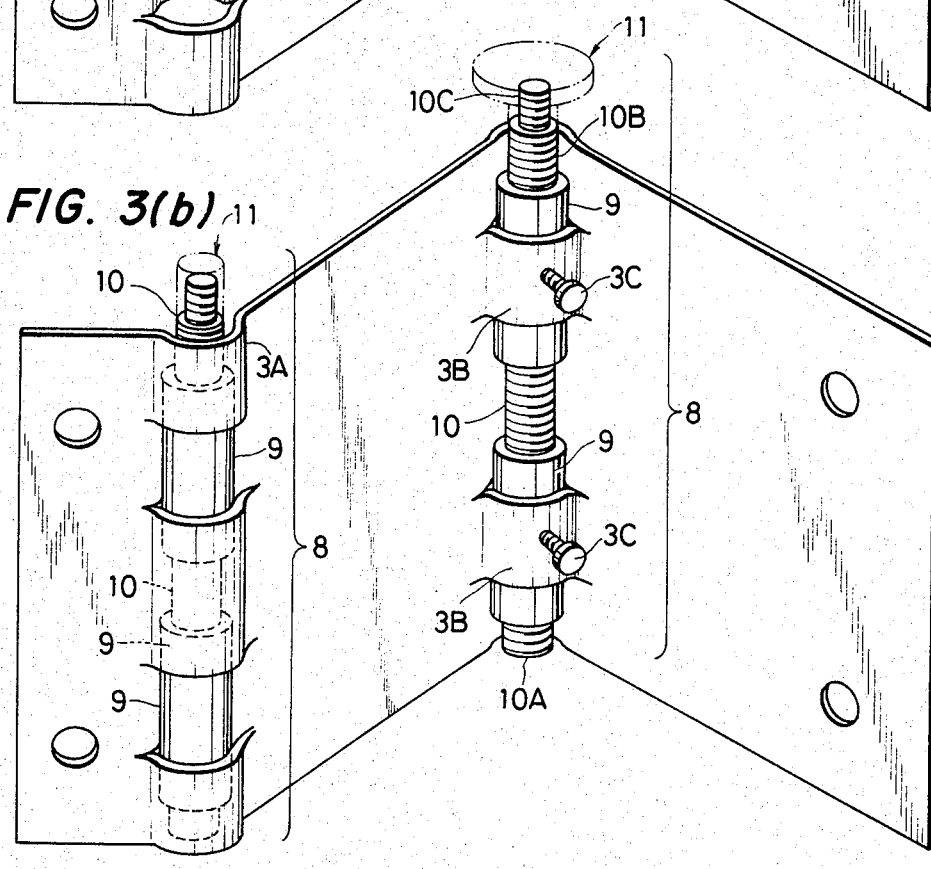

FIGS. 3 (a) and (b) illustrate a single frame piece 3. Frame piece 2 or 4 has a similar structure. As shown in the same figure, the frame piece 3 provides a supporting portion 3B which is formed in the inside of said angled portion 3A by partly protruding said frame piece in the form of a groove. Said supporting portion 3B supports the adjustable supporting means 8 which holds a hexagonal single lens 7 or aggregate of lenses 6. Meanwhile, this adjustable supporting means 8 is composed of, as shown in FIGS. 3 and 4, cylinder 9 which is engaged with said supporting means 3B and is fixed therein, bolt shaft 10 which is inserted into said cylinder 9 and is supported in such a manner that it is capable of rotating and moving in the axial direction, and engaging portion 11 which is attached to the top of bolt shaft 10 and is engaged with the lens.

Said cylinder 9 has smooth outer surface but female-threaded inner surface and is longer in the axial direction than said supporting means 3B. In addition, said cylinder 9 is fit into said supporting means 3B until it is centered therein, with the end portions of cylinder 9 being in contact with the inner wall of the angled portion 3A of the frame piece 3. Thus, said cylinder 9 is held by said frame piece 3 in such a manner that it is being sandwiched between both portions. In order to more securely fix said cylinder 9 to said frame piece 3, said supporting means 3B is further provided with a screw hole 3D for permitting screwing of set-screw 3C through said supporting means so that said cylinder 9 can be fixed to said frame piece 3.

The bolt shaft 10 is provided with a groove (not illustrated) at its bottom end 10A for engagement with a screw driver bolt shaft 10 also provided with a stepped portion 10B and a threaded portion 10C of smaller diameter at the top end portion. This threaded stepped portion 10C is provided with an engaging portion 11 as shown in FIGS. 4 and 5, and thereby a single lens or aggregate of lenses 6 is held on bolt shaft 10 via said engaging portion 11.

Figure 4:
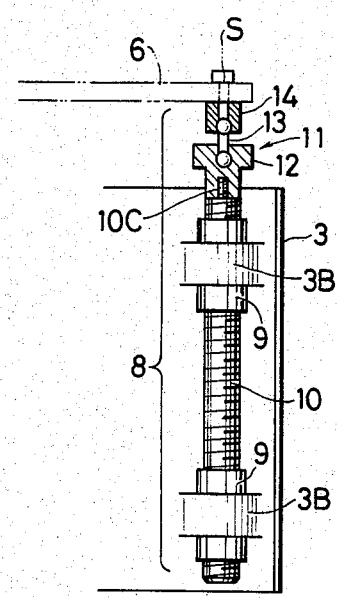
FIG. 4 is an outline longitudinal sectional view of the adjustable supporting means.
Figure 5:
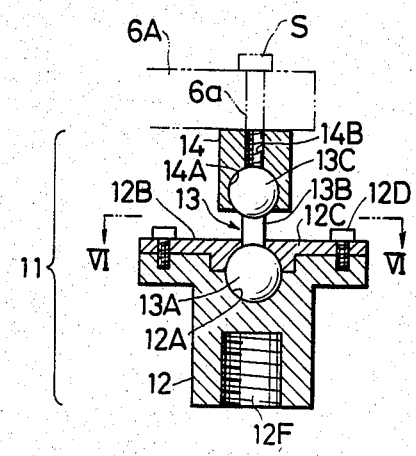
FIG. 5 is an enlarged sectional view of a part of the adjustable supporting means illustrated in FIG. 4.
Figure 6:
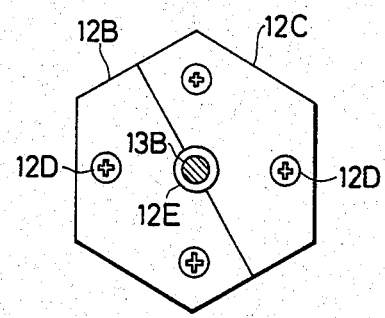
FIG. 6 is a plan view taken along the line VI—VI of FIG. 5 indicated by the arrow mark.

As shown in FIGS. 4 to 6, said engaging portion 11 comprises a seat nut 12 which is mounted on the threaded stepped portion 10C of the bolt shaft 10, a pivot which is supported in such a manner that it can move in various directions. Upper nut 14 is supported on said pivot 13 and is capable of shifting relatively. The seat nut 12 is provided at its upper surface, a half-spherical space (concave) 12A in order to accommodate therein the spherical portion 13A at the lower end of said pivot 13 and also has covers 12B and 12C in order to clamp said spherical portion as illustrated in FIGS. 5 and 6. The cover is composed of a pair of half portions 12B and 12C, with each half portion so constructed that it is fixed to the nut seat 12 by the set screws 12D. Each half portion 12B and 12C has a semi-circular indentation such that, when the half portions are mounted, there is provided a hole 12E at the center in order to allow the shaft 13B of the pivot 13 to pass therethrough. Said seat nut 12 is also provided at the bottom portion with a screw hole 12F which engages with the threaded stepped portion 10C of the bolt shaft 10, making it possible to fix said seat nut 12 on the bolt shaft 10.

The upper nut 14 is provided with a spherical space (concave) 14A for engagement with the upper spherical portion 13C of pivot 13 and also allows a screw hole 14B opening to said spherical space 14A to pass through the upper surface of said upper nut 14. This screw hole 14B is connected to a hole 6a bored in the aggregate of lenses 6 or the lens 7. Thus, a set-screw S can be inserted through said screw hole 14B and the hole 6a in order to prevent relative motion (shear) to be generated between the upper nut 14 and the spherical portion 13C of pivot.

Figure 7:
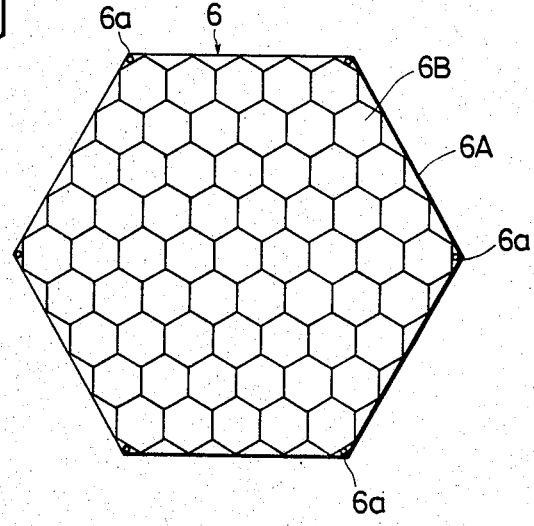
FIG. 7 is a plan view of an aggregate of lenses arranged along the plane of holding a frame illustrated in FIG. 1.

In case an aggregate of lenses 6 as illustrated in FIG. 1 is fixed on the upper nut 14, such aggregate of lenses 6 can be formed as follows. Namely, an aggregate of lenses 6 is composed of, as shown in FIG. 7, a hexagonal lens supporting plate 6A and plurality of hexagonal small-size lenses 6B arranged contiguous each other on said lens supporting plate 6A as shown in the same figure. Said hole 6a is bored through the area in the vicinity of each crest portion of lens supporting plate 6A and thereby said set-screw S can be screwed into the screw hole 14B of upper nut 14 from the upper portion of the lens supporting plate 6A.

The sunbeam concentrating and collecting apparatus of the aforementioned structure to which the present invention is applied is assembled as follows:

In case an aggregate of lenses 6 is used in place of a single lens 7 as the lens system to be arranged along the end plane of the unit frame 1A, an aggregate of lenses 6 must be manufactured simultaneously or prior to manufacture of the holding frame 1.

On the other hand, the holding frame 1 can be assembled by mutually coupling frame pieces 2 to 4 with the bolts 5 but it is desirable in this case that the adjustable supporting means 8 is mounted to the supporting portions 2B to 4B after the frame pieces 2 to 4 are assembled and any other procedure than mutually coupling the frame pieces 2 to 4 with the bolts 5 is no longer required on the occasion of assembling the holding frame 1. The adjustable supporting means 8 can, of course, be attached to the frame pieces 2 to 4 by screwing the bolt shaft 10 into the cylinder 9 after inserting and fixing the cylinder 9 into the supporting portions 2B to 4B of frame pieces 2 to 4, but it is also possible to attach the cylinder 9 to the supporting portions 2B to 4B of the frame pieces 2 to 4 after the cylinder 9 is engaged previously with the bolt shaft 10.

The engaging portion 11 mounted on top of the bolt shaft 10 is screwed into the bolt shaft 10 after the bolt shaft 10 is screwed into the cylinder 9 but it may be mounted on top of the bolt shaft 10 after assembling the holding frame 1.

When the frame 1 is assembled and the adjustable supporting means 8 is mounted to the frame 1, an aggregate of lenses 6 or single lens 7 is fixed on the upper nut 14 by any conventional means such as screwing, bonding, caulking, pin coupling, and the like. After a single lens or aggregate of lenses 6 is placed on the adjustable supporting means 8, the inclination of the lens surface can be adjusted by rotating it so that each desired bolt shaft 10 by means of a screw driver inserted in groove 10A moves in the axial direction. When this is done, since a reasonable amount of relative sliding is allowed between the upper nut 14 and seat nut 12 at both the upper and lower ends of pivot 13, if the heights of the crest points of said lens 7 or aggregate of lenses 6 is mutually different, it is undesirable to generate mechanical residual stress between said lens 7 or aggregate of lenses 6 and the engaging portion 11. Under the abovementioned condition that the desired facilities are provided so that relative motion between the aggregate of lenses 6 and the engaging portion 11 is not generated, after the inclination of the lens surface is once adjusted, said pivot 13 and the engaging portion 14 are rigidly coupled by screwing the set-screw S into the screw hole 14B of the upper nut 14 via the hole 6a from the upper portion of the lens supporting plate 6A and by pressing the end point of said set-screw S to the upper spherical portion 13C of pivot 13. Alternatively, a bonding agent can be supplied into the hole 12E between the covers 12B and 12C of the seat nut 12 and then hardened, thereby fixing the pivot 13 to the seat nut 12 whereby relative motion between the pivot 13 and seat nut 12 is prevented. Furthermore, a lock nut can be applied to the bottom end of bolt shaft 10 while it is held so that it can no longer rotate and then said nut is pressed to the end surface of supporting portion 3B of the frame piece 3. Thereby, the bolt shaft 10 can be fixed.

In case of assembling a comparatively small-scale sunbeam concentrating and collecting apparatus, a desired one can be obtained only with a single unit frame 1A as the holding frame 1 but if a large-scale one is required, such apparatus can also be obtained utilizing a plurality of unit frames 1A as the holding frame 1. In the latter case, particularly, the present invention assures comparatively low-cost manufacturing of an apparatus even if it is a large-scale one, and also realizes not only mass-production of limited types but also mass-production of diversified types, because the holding frames in various sizes can be assembled only by coupling mutually the aforementioned three kinds of frame pieces 2 to 4.

As will be readily be understood from the foregoing description, according to the present invention, the sunbeam concentrating and collecting apparatus in desired sizes can be manufactured easily and moreover economically.

In the above preferred embodiment, only a single example is given as an adjustable supporting means 8 but it is of course not restricted only to the embodiment illustrated herein. In addition, the supporting portions of adjustable supporting means are provided only at the inner side of each angled portion of the frame piece in the above embodiment, but it is obviously possible to provide said supporting portions at the outer side of each angled portion. Further, said supporting portion can be configured in the form of a tongue piece (namely, a projected piece) having a through hole, instead of a groove in the given embodiment. The frame pieces 2 to 4 can also be formed as a rod type frame piece instead of a plate type.

What is claimed is:

1. A sunbeam concentrating and collecting device comprising:
  (A) at least one regular polygonal holding frame comprising a plurality of angled frame segments joined together to form said holding frame;
  (B) at least one lens on said holding frame; and (C) adjustable means disposed in each of the included angles of said regular polygonal holding frame for supporting said at least one lens on said holding frame.

2. A sunbeam concentrating and collecting apparatus, comprising a plurality of devices as defined in claim 1 arranged in a planar array.

3. A sunbeam concentrating and collecting apparatus as defined in claim 2, wherein said planar array is in a regular polygonal shape.

4. A sunbeam concentrating and collecting apparatus as defined in claim 2, wherein said planar array is in a honeycomb shape.

5. A sunbeam concentrating and collecting apparatus as defined in claim 4, wherein each of said devices in hexagonal in shape.

6. A sunbeam concentrating and collecting apparatus as defined in claim 2, wherein each of said adjustable supporting means comprises:

(A) a threaded shaft threadedly supported by said frame segment; and (B) engaging means supported at the upper end of said shaft and adapted to fixedly receive said at least one lens thereon.

7. A sunbeam concentrating and collecting apparatus as defined in claim 6, wherein said engaging means comprises:

(A) a seat nut threadedly affixed to the upper end of said shaft;

(B) an upper nut to which said at least one lens is affixed; and (C) a swivel member joining said upper nut to said seat nut.

8. A sunbeam concentrating and collecting apparatus as claimed in claim 7, wherein said swivel member is joined to each of said nuts by means of a ball-and-socket.

9. A sunbeam concentrating and collecting apparatus as claimed in claim 8, wherein said shaft has a threaded stepped portion at the upper end thereof to which said seat nut is affixed.

* * * * *